Dec. 30, 1924.

A. SPILLMAN

ENGINE PISTON

Filed Feb. 15, 1923

1,520,972

Inventor,
Albert Spillman,
by Geyer Popp
Attorneys.

Patented Dec. 30, 1924.

1,520,972

UNITED STATES PATENT OFFICE.

ALBERT SPILLMAN, OF NORTH TONAWANDA, NEW YORK.

ENGINE PISTON.

Application filed February 15, 1923. Serial No. 619,303.

*To all whom it may concern:*

Be it known that I, ALBERT SPILLMAN, a citizen of the United States, residing in North Tonawanda, in the county of Niagara and State of New York, have invented new and useful Improvements in Engine Pistons, of which the following is a specification.

This invention relates more particularly to the pistons used in explosion engines or motors.

One of its objects is the provision of a resilient self-adjusting piston of improved construction.

Another object is to provide the piston with simple and reliable means for returning the oil scraped from the cylinder walls by the piston back into the latter and thence into the crank case, with a view of preventing the oil from working past the piston into the top of the cylinder and avoiding fouling of the spark plugs and a smoking exhaust.

Figure 1:
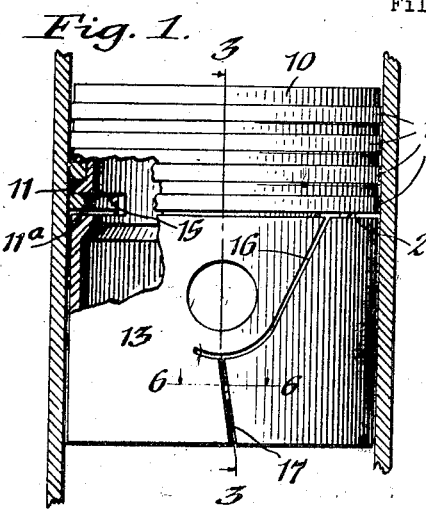
Figure 2:
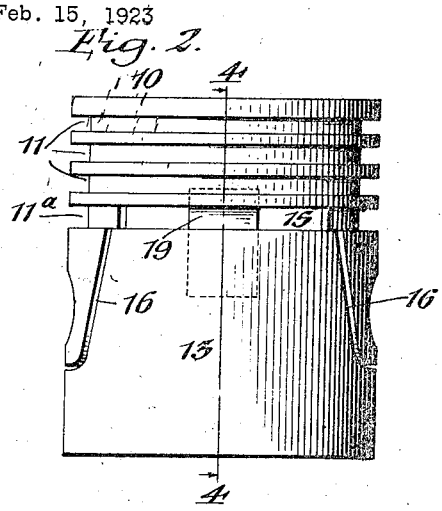
Figure 3:
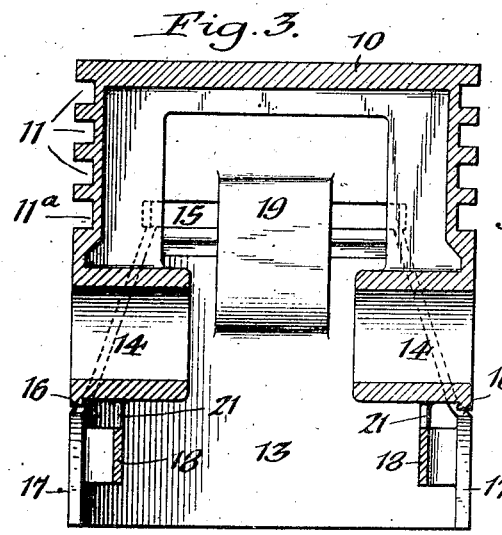
Figure 4:
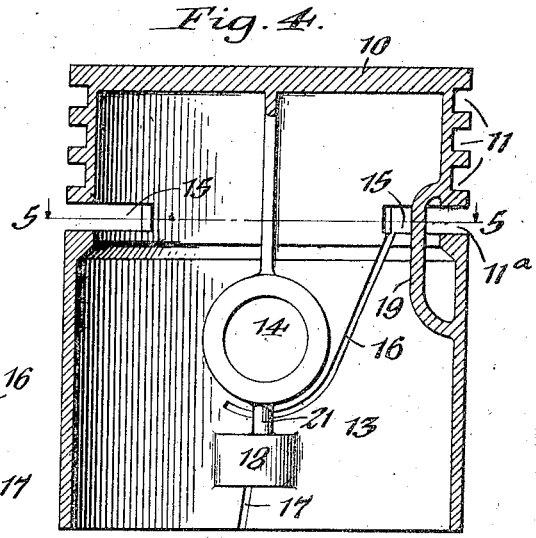
Figure 5:
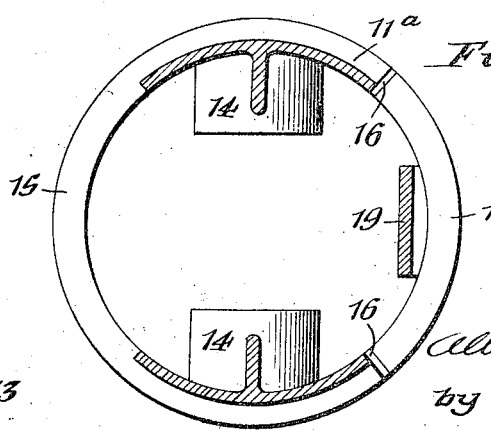
Figure 6:
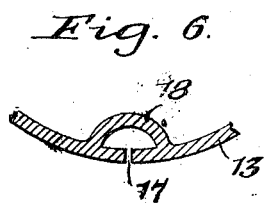

In the accompanying drawings: Figure 1 is a sectional elevation of the improved piston combined with a cylinder. Figure 2 is a side elevation of the piston taken at right angles to Fig. 1. Figure 3 is an enlarged vertical section on line 3—3, Fig. 1. Figure 4 is an enlarged vertical section on line 4—4, Fig. 2. Figure 5 is a horizontal section on line 5—5, Fig. 4. Figure 6 is an enlarged fragmentary sectional view taken on line 6—6, Fig. 1.

Similar characters of reference refer to like parts throughout the several views.

10 represents the head of the piston which is provided with the customary grooves 11 for receiving the packing rings 12, and 13 the skirt or tubular body portion thereof. Integral with the latter and extending inwardly from diametrically opposite sides thereof are the usual bearings 14, 14 for the wrist-pins of the connecting rod, not shown. In order to give the skirt the necessary resilience or contractile capacity to prevent scoring of the cylinder, it is provided at opposite sides with transverse or substantially horizontal slots 15 located above the wrist-pin bearings, and angular slits 16 extending from points at or near one end of the horizontal slots to a point below said bearings, as best shown in Figs. 1, 2 and 4. These angular slits preferably extend in the same direction from the corresponding ends of the horizontal slots. The latter are formed in one of the ring grooves 11, preferably the rearmost or lowermost one, designated 11ª, and in those sides thereof at right angles to the sides containing the bearings 14, while the angular slits extend downwardly around one side of said bearings and terminate at a point a suitable distance beyond the vertical axis thereof, as shown in Figs. 1 and 3. Oblique longitudinal slits 17 may also be provided in the skirt, which are preferably arranged substantially in line with the axes of the wrist-pin bearings and which extend from the base of the angular slits to the lower edge of the skirt.

To obtain the best results, the ends of the horizontal slots 15 preferably terminate at a point approximately forty degrees from the axes of the wrist-pin bearings.

By slitting the piston in this manner, the skirt is divided into resilient sections which yield more or less in response to the expanding and contracting movements of the cylinder, maintaining a tight fit and at the same time preventing scoring of the cylinder. In order to prevent the sectional skirt from collapsing or contracting below its normal diameter and remaining in such position and still permit it to expand and contract with the cylinder, yieldable transverse connecting webs 18 are provided which are located at one or both sides of the piston and joined to the skirt sections on opposite sides of the oblique slits 17, as shown in Figs. 4 and 6. If desired, one of these oblique slits may be omitted so as to leave that side of the piston rigid.

Located on the resilient or non-thrust side of the piston and connecting the head with the skirt thereof above and below the corresponding horizontal slot 15 is a longitudinal web or bridge piece 19 which is preferably cast integral with the piston. The ends of this bridge piece are located a suitable distance above and below the slot.

The lowermost ring-receiving groove 11ª in which the horizontal slots 15 are located is preferably somewhat wider than the remaining grooves, and the slots are of substantially the same width as said lowermost groove. The several packing rings 12 seated in the grooves 11 are of a standard width to fit them. The lowermost ring is of the same size as the others, but as the corresponding groove is somewhat wider, a relief space or oil-conducting passage 20 is left between one of the walls of said groove and its ring, as shown in Fig. 1, whereby any oil scraped from the walls of the cylinder by said ring on the downstroke of the piston, is forced through said space, and through the slots 15 into the exterior of the hollow piston, whence it flows back into the engine crank-case. The lowermost packing ring functions as a valve during the reciprocation of the piston, so that on the down stroke of the latter said ring is compelled by the pressure acting against it to rise against the upper wall of its groove, thus leaving the necessary clearance below the lower edge of the ring to allow the oil to escape into and through the slots 15.

By providing such return slots or passages for the surplus oil, the latter is prevented from working past the top of the piston, avoiding smoking of the exhaust and fouling of the spark plugs. This also results in utilizing a larger amount of oil and a better lubrication of the piston, and eliminates the formation of carbon on the cylinder walls.

As shown in Figs. 3 and 4, substantially upright stiffening posts 21 may be provided which connect the webs 18 with the under-side of the bearings 14.

I claim as my invention:

1. An engine piston comprising a skirt having wrist pin bearings and a head having packing ring grooves and a transverse slot formed in the bottom of one of said grooves and located in a side of the piston at right angles to the sides containing the wrist-pin bearings, said skirt having a slit arranged at an angle to said transverse slot and joined at its upper end therewith, the lower end of said skirt-slit extending around the lower side of the adjacent wrist-pin bearing and terminating at a point beyond its vertical axis.

2. An engine piston, comprising a skirt having wrist pin bearings and a head having packing ring grooves and a transverse slot formed in the bottom of one of said grooves and located in a side of the piston at right angles to the sides containing the wrist-pin bearings, said skirt having slits arranged at an angle to said transverse slots and joined at their upper ends to the corresponding ends thereof, said skirt-slits trending in the same directions and their lower ends extending around the lower sides of said wrist-pin bearings and terminating at a point below the same.

3. An engine piston, comprising a skirt having wrist-pin bearings, and a head having transverse slots located in those sides thereof at right angles to the sides containing the wrist-pin bearings, said skirt having correspondingly trending slits joined at their upper ends to said transverse slots, while their lower ends extend below the wrist-pin bearings and terminate at a point substantially in line with the vertical axes thereof, the skirt also having longitudinal slits extending from the lower portion of the first named slits to the lower edge of the skirt, whereby the skirt is divided into yieldable sections.

4. An engine piston comprising a skirt having wrist-pin bearings, a head having transverse slots located in those sides thereof at right angles to the sides containing the wrist-pin bearings, said skirt having correspondingly trending slits joined at their upper ends to said transverse slots, while their lower ends extend below the wrist-pin bearings and terminate at a point substantially in line with the vertical axes thereof, the skirt also having longitudinal slits extending from the lower portion of the first-named slits to the lower edge of the skirt, whereby the skirt is divided into yieldable sections, and yieldable means joining the portions of said skirt sections adjacent to said longitudinal slits.

5. An engine piston, comprising a skirt having wrist-pin bearings, a head having transverse slots located in those sides thereof at right angles to the sides containing the wrist-pin bearings, said skirt having correspondingly trending slits joined at their upper ends to said transverse slots, while their lower ends extend below the wrist-pin bearings and terminate at a point substantially in line with the vertical axes thereof, the skirt also having longitudinal slits extending from the lower portion of the first-named slits to the lower edge of the skirt, whereby the skirt is divided into yieldable sections, and yieldable transverse tie members connecting said skirt sections and bridging said longitudinal slits.

6. An engine piston, comprising a skirt having wrist-pin bearings, a head having transverse slots located in those sides thereof at right angles to the sides containing the wrist-pin bearings, said skirt having correspondingly trending slits joined at their upper ends to said transverse slots, while their lower ends extend below the wrist-pin bearings and terminate at a point substantially in line with the vertical axes thereof, the skirt also having longitudinal slits extending from the lower portion of the first-named slits to the lower edge of the skirt, whereby the skirt is divided into yieldable sections, yieldable transverse tie members connecting said skirt sections and bridging said longitudinal slits, and stiffening posts connecting said tie members with the wrist-pin bearings.

ALBERT SPILLMAN.